Patented July 31, 1951

2,562,861

UNITED STATES PATENT OFFICE 2,562,861

MANDELIC ACID PURIFICATION INVOLVING PRODUCTION OF COMPLEX ALKALI METAL SALTS THEREOF

Bernard F. Duesel, Yonkers, and Sidney Gister, New York, N. Y., assignors to Nepera Chemical Co. Inc., Yonkers, N. Y., a corporation of New York No Drawing. Application November 23, 1949, Serial No. 129,198

6 Claims. (Cl. 260—525)

This invention relates to the separation of organic impurities from crude mandelic acid reaction products and particularly to the production of substantially pure mandelic acid. The purification process of the invention involves the production of an alkali metal complex salt of mandelic acid and this new compound constitutes an additional feature and embodiment of the instant invention.

Mandelic acid has heretofore been produced commercially by the hydrolysis of mandelonitrile obtained by reacting benzaldehyde with sodium cyanide in the presence of sodium bisulfite. (See Organic Syntheses, Coll. vol. 1, page 329.) Another method more recently developed and in some respects superior to the foregoing process starts with acetophenone and produces mandelic acid therefrom by first preparing the dichloro derivative and then hydrolyzing to produce the mandelic acid. (See Organic Syntheses, vol. 23, page 48.) The mandelic acid produced by either method is contaminated with both organic and inorganic impurities, the latter being unreacted initial material or one or more by-products or intermediate reaction products.

The purification of this crude mandelic acid as described in the above cited syntheses, is time consuming, expensive and difficult to operate. The disclosed procedure involves extracting with ether in a process taking forty-eight hours or more for completion, distilling to remove the ether, drying the product by warming under a vacuum, adding a large quantity of benzene, distilling off a portion of the benzene, adding ethyl alcohol, filtering and crystallizing out a part of the mandelic acid by cooling to 60° C. and evaporating additional solvent to recover the remaining acid which does nto crystallize out by the cooling step.

A second known method of purification involves evaporating the aqueous reaction mass to dryness and extracting the residue with hot benzene. In view of the slight solubility of mandelic acid in benzene, this procedure is undesirable for operation on a commercial scale. Furthermore, the evaporation of the aqueous solution of crude mandelic acid is disadvantageous, for an appreciable part of the crude mandelic acid decomposes under prolonged heating in water. The organic by-products formed by such decomposition as well as other by-products present from the preceding production reactions are extracted along with the mandelic acid in the benzene solution.

An object of the present invention is to provide a simplified process of producing pure mandelic acid involving a lower cost of production. Another object is to prepare a new salt of mandelic acid producible from crude mandelic acid reaction masses and readily purifiable including removal of the organic impurities.

Another object is to produce pure mandelic acid from crude mandelic acid solutions or reaction masses such as are produced by the two processes mentioned above by a simpler procedure than heretofore employed, involving a fewer number of steps and not involving the various purification steps heretofore applied to the crude mandelic acid and considered essential to produce pure material.

Broadly considered, the process of the invention may be said to reside in the separation of organic impurities from the mandelic acid component of crude mandelic acid reaction masses containing such impurities by steps involving the conversion of the mandelic acid content of the solution into a complex salt thereof having the empirical formula $C_{16}H_{15}O_6R$ in which R is an alkali metal, crystallizing the said salt out of the solution, separating the solution from the crystals and removing the organic impurities from the salt crystals by dissolving them out in an organic solvent thereby producing the mandelic acid component in pure condition. This process can also be considered a process for producing the new complex alkali metal salts of mandelic acid.

The production of the said complex salt may be easily accomplished in accordance with the present invention merely by forming an aqueous alkaline solution having a pH value of about 3.5 by adding to the crude mandelic acid solution an alkali metal compound such as sodium hydroxide and the sodium salt of carbonic acid or other weak acid, or, the corresponding potassium salts. The alkali is preferably added in the form of a concentrated aqueous solution to the crude mandelic acid solution formed by either of the hereinbefore mentioned processes. The complex salt formed in the concentrated solution may be crystallized simply by cooling the reaction mass.

The removal of the organic impurities from the precipitated complex salt crystals may be accomplished simply by filtering the reaction mass and washing the crystals obtained with acetone, benzene, chlorinated hydrocarbons or the like, for the complex is not soluble to any appreciable extent therein.

For the production of optimum yields, the adjustment of the reaction to an acidity of exactly 3.5 pH value is required. At acidities differing from this value, lower yields of the complex salt are obtained, as at a pH value of 3.3 or 3.7 a twenty per cent reduction in yield is obtained. At acidities approaching neutrality, the simple mandelic salt is obtained and this product does not crystallize like the complex salt and hence cannot be purified by the simple procedure of the present invention.

The complex alkali metal salts of mandelic acid are glistening white crystals sparingly soluble in alcohol, and insoluble in acetone, ether and benzene.

The structure of the complex salts has not been definitely determined, but observations made so far indicate that they are composed of one mol of mandelic acid and one mol of the mandelate salt of the metal employed, which crystallize together to form the single compound. Theories of modern physical chemistry provide other explanations for the formation of the complex salt and some of these appear tenable. On actual test it has been determined, however, that the empirical formula of the complex sodium salt is $C_{16}H_{15}O_6Na$. The results obtained and the theoretical content of such compound are as follows:

Carbon, found 59.07%, theory 58.88%
Hydrogen, found 4.81%, theory 4.63%
Sodium, found 6.92%, theory 7.00%
Titration equivalent 327, theory 326.09

When the process of the instant invention is to be employed for the production of pure or substantially pure mandelic acid, the alkali metal complex mandelic acid salt purified by the above crystallization and washing procedure is merely subjected to decomposition by any conventional process for producing free acids from soluble salts thereof.

The decomposition may be accomplished, for example, merely by introducing the salt into a small amount of water, cooling it and introducing an acid such as hydrochloric acid in an amount required to impart to the solution a pH value of 1.8. The mandelic acid thereby formed can be separated from the solution merely by cooling the same to a temperature at which the acid crystallizes out. The relatively small quantity of sodium chloride or other salt formed will remain in the dissolved liquor and hence the mandelic acid is obtained in practically pure condition.

In accordance with a second method of decomposition, the complex salt is suspended in benzene, and hydrochloric acid or other similar acid is added in small amount. Thereupon the water present is removed by azeotropic distillation and acetone or alcohol is added to dissolve all of the mandelic acid leaving the sodium chloride or other salt formed in insoluble condition, the latter being separated by simple filtration. Still another method of decomposing the complex salt involves removing the sodium ion from the salt by contacting the same with a resin ion exchanger.

In the examples which follow, the methods by which the crude mandelic acid reaction masses are obtained are described, but the invention is not to be considered as limited to the treatment of these specific initial or raw materials.

*Example I*

One hundred and eighteen grams of sodium cyanide are dissolved in 400 cc. of water. Thereupon 212 g. of benzaldehyde are added during stirring. Next a saturated solution of sodium bisulfite is prepared and 660 cc. thereof are added to the above solution in a reaction vessel having added thereto a sufficient amount of ice to maintain the temperature at 15° C. After the reaction mass has stood one-half hour, an oily layer separates out, ordinarily amounting to about 265 g. This oil, composed of mandelonitrile, is then hydrolyzed by adding it to 250 cc. of concentrated hydrochloric acid during which operation the temperature rises to 100° C. The hydrolysis goes to completion in about twenty minutes.

In accordance with the process of the invention, a 40% sodium hydroxide solution is thereupon added in an amount which adjusts the pH value to 3.5, the mixture being cooled in an ice bath during the addition. A white crystalline solid forms and is separated from the liquid suitably by simple filtration. The crystals are then washed free from the impurities by means of acetone. The crystalline solid obtained will weigh about 182 g. and will have a melting point of 201° C. This property indicates that the sodium complex salt of mandelic acid is formed.

*Example II*

Nine hundred and sixty grams of technical acetophenone are dissolved in 192 g. of glacial acetic acid and thereupon 1195 g. of chlorine are passed into the solution at a temperature of 53°–57° C. during a period of seven hours. The mixture is washed with two liters of water to remove the acetic acid. The dichloracetophenone separates off as an oil. The yield of crude dichloracetophenone is about 1500 g. or nearly the theoretical amount. One thousand five hundred grams of the dichloracetophenone is hydrolyzed by warming at a temperature of 55°–60° C. for two hours in 4800 cc. of water containing 1140 g. of NaOH. Hydrochloric acid is then added until a pH value of 3.5 is reached. The mixture is then cooled. After washing with 100 cc. of acetone to remove impurities, 1340 g. of a white crystalline complex sodium salt of mandelic acid, melting at 201° C. is obtained.

The production of mandelic acid from the complex salts obtained in either of the above examples may be accomplished by a conventional decomposition or splitting procedure, as for example, by any of the following three methods:

A. Fifty grams of the complex sodium salt of mandelic acid is suspended in 100 cc. of boiling water and an amount of concentrated hydrochloric acid solution is added which adjusts the pH value to 1.8. The resulting solution is cooled to 10° C. thereby causing the mandelic acid to crystallize out. The liquor or water containing the sodium chloride formed is filtered off and the acid is washed free from any trace of the salt by flowing a small amount of ice water through the crystals. The melting point of the product obtained will be found on test to be 119° C., which is the melting point of mandelic acid.

The liquor separated from the crystals containing some mandelic acid and the small amount of salt formed is used in the decomposition of another batch of the complex sodium salt of the mandelic acid, and the operation can be repeated a number of times before the concentration of the sodium chloride formed reaches the saturation point.

B. Fifty grams of the complex sodium salt of mandelic acid is suspended in 200 cc. of benzene and 8 cc. of concentrated hydrochloric acid are added. After a short period of stirring, the benzene is distilled off until no further water is carried over. Thereupon 20 cc. of isopropanol is added thereby rendering the mandelic acid more soluble while leaving the sodium chloride in the undissolved state. The resulting mass in hot condition is then filtered to separate the insoluble sodium chloride. Finally, the solution is cooled to crystallize out the mandelic acid which may be separated from the solution by simple filtration.

C. A solution of 20 g. of the complex sodium salt of mandelic acid in 200 cc. of water is passed through a base exchange resin at the rate of 4 cc. per minute. (Amberlite exchange resin I-R-100 is satisfactory.) The said resin is contained in a column one-half inch in diameter and thirty-six inches high. This treatment removes the sodium ion from the salt and produces mandelic acid. The solution obtained is treated with charcoal to remove the brown color, is filtered and then evaporated to dryness. The treatment with the resin solution has the same effect on the acidity as the addition of hydrochloric acid, for the original pH value of the solution of 3.5 is changed to a final pH value of 1.8.

The complex sodium salt of mandelic acid produced in accordance with the process of the present invention possesses a melting point of 201° C. while that of the simple sodium mandelate is 272° to 282° C. The complex salt, furthermore is soluble only to the extent of one part in twelve parts of water, which solubility is less than that of either sodium mandelate or mandelic acid itself. One gram of sodium mandelate will dissolve in 1.1 cc. of water and mandelic acid will dissolve to the extent of 1 g. in 6.3 cc. of water.

The complex alkali metal salts of mandelic acid of the invention can be prepared from pure mandelic acid as well as from the impure solutions hereinbefore described simply by adding sufficient concentrated alkali hydroxide or alkali carbonate solution to a concentrated solution of the mandelic acid to provide a reaction mass having the critical pH value. For instance concentrated sodium hydroxide or sodium carbonate solution may be added to a concentrated solution of the mandelic acid to provide a reaction mass having a pH value of 3.5. When simple sodium mandelate known to the art is dissolved, it produces a solution having a pH value of 6.4.

Besides their use for the preparation of pure mandelic acid, the alkali metal complex salts of the present invention may be employed in organic syntheses and in other fields for which the simple alkali metal salts of the acid are adapted.

The procedures set forth herein constitute practical methods for carrying out the process of the invention to produce the new compounds and to provide mandelic acid in pure form, but the invention is not limited to any specific temperatures, times, quantities or steps of procedure except as otherwise herein stated, for the description is given simply to define preferred methods by which the invention may be performed. The scope of the invention is to be limited only by the terms of the claims appended hereto.

We claim:
1. The process which comprises mixing crude mandelic acid containing organic impurities resulting from the process used in its preparation with an aqueous alkaline solution of an alkali metal compound, at a pH value of about 3.5 thereby forming a complex alkali metal salt of mandelic acid.

2. The process which comprises mixing crude mandelic acid containing organic impurities resulting from the process used in its preparation with an aqueous alkaline solution of an alkali metal compound, at a pH value of about 3.5 thereby forming a complex alkali metal salt of mandelic acid in the reaction solution, crystallizing the said salt out of the solution, separating the solution from the crystals and removing the organic impurities from the latter by dissolving them out in an organic solvent thereby obtaining the mandelic acid component in substantially pure form free of the organic impurities.

3. The process which comprises mixing crude mandelic acid containing organic impurities resulting from the process used in its preparation with an aqueous alkaline solution of an alkali metal compound, at a pH value of about 3.5 thereby forming a complex alkali metal salt of mandelic acid in the reaction solution, crystallizing the said salt out of the solution, separating the solution from the crystals and washing out the organic impurities from the latter by dissolving therein an organic solvent, removing the solvent containing the organic impurities from the complex salt, then regenerating the free mandelic acid by decomposing the complex salt and finally separating the sodium salt formed by the decomposition reaction from the said mandelic acid leaving the said acid in substantially pure condition.

4. A process for the purification of crude mandelic acid containing organic impurities resulting from the process used in its preparation which comprises, mixing the crude mandelic acid with an alkali metal hydroxide solution in a quantity producing a reaction mass having a pH value of about 3.5 thereby forming a complex alkali metal salt of mandelic acid, crystallizing out the said salt, separating the liquid present from the crystals, removing the organic impurities present by washing with an organic solvent, then regenerating the free mandelic acid by decomposing the complex salt and finally separating the sodium salt formed by the decomposition from the said mandelic acid leaving the said acid in substantially pure condition.

5. A process for the production of substantially pure mandelic acid from crude mandelic acid containing organic impurities present as a result of the process employed in its preparation which comprises, mixing with the crude mandelic acid an alkali metal carbonate in a quantity which adjusts the pH value of the reaction mass to about 3.5 thereby forming a complex alkali metal salt of mandelic acid, cooling the reaction mass thereby crystallizing out the said complex salt from the liquid present, separating the liquid from the crystals, washing out the organic impurities by means of an organic solvent, then regenerating the free mandelic acid by decomposing the complex salt and finally separating the alkali metal salt formed by the decomposition reaction from the said mandelic acid leaving the said acid in substantially pure condition.

6. A process for removing organic impurities from the mandelic acid content of crude mandelic acid solutions containing such impurities as a result of the method used in its production which comprises, adding an aqueous alkaline solution of an alkali metal compound in a quantity producing a reaction mass having a pH value of about 3.5 thereby forming a complex alkali metal salt of mandelic acid in the reaction solution, cooling the said solution thereby crystallizing the said salt, filtering off the solution from the crystals and removing the organic impurities adhering to the crystals by washing the crystals with an organic solvent.

BERNARD F. DUESEL.
SIDNEY GISTER.

REFERENCES CITED

The following references are of record in the file of this patent:

Gatterman, Org. Chem. (Macmillan), p. 1 (1896).

McKenzie et al., J. Chem. Soc., vol. 121, p. 356 (1922).